United States Patent
Nystrom (10) Patent No.: US 12,174,368 B2
(45) Date of Patent: Dec. 24, 2024

(54) WIRE BONDED COMMON ELECTRICAL CONNECTION IN A PIEZOELECTRIC MICRO-ELECTRO-MECHANICAL SYSTEM SCANNING MIRROR ASSEMBLY

(71) Applicant: Microsoft Technology Licensing, LLC, Redmond, WA (US)

(72) Inventor: Michael James Nystrom, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/093,494

(22) Filed: Jan. 5, 2023

(65) Prior Publication Data

US 2023/0146362 A1 May 11, 2023

Related U.S. Application Data (62) Division of application No. 16/382,876, filed on Apr. 12, 2019, now Pat. No. 11,555,999.

(51) Int. Cl.
*G02B 26/08* (2006.01)
*G02B 26/10* (2006.01)
(Continued)

(52) U.S. Cl.
CPC ......... *G02B 26/0858* (2013.01); *G02B 26/10* (2013.01); *H02N 2/0055* (2013.01);
(Continued)

(58) Field of Classification Search
CPC .. G02B 26/0858; G02B 26/10; G02B 26/105; G02B 26/101; G02B 26/085; H02N 2/0055; H02N 2/0085; H02N 2/028; B81B 2201/042; B81B 3/0083; B81B 3/0086; B81B 2203/04; B81C 3/001
(Continued)

(56) References Cited

U.S. PATENT DOCUMENTS

| | | | |
|---|---|---|---|
| 2009/0185254 A1* | 7/2009 | Uchigaki | G02B 26/105 351/200 |
| 2009/0284818 A1* | 11/2009 | Maekawa | G02B 26/0858 29/25.35 |
| 2010/0085623 A1* | 4/2010 | Matsumoto | G02B 26/0841 359/221.2 |

OTHER PUBLICATIONS

Communication under Rule 71(3) Received in European Patent Application No. 20720983.4, mailed on Jul. 15, 2024, 8 pages.

* cited by examiner

*Primary Examiner* — Jennifer D. Carruth
(74) *Attorney, Agent, or Firm* — Shook, Hardy & Bacon L.L.P.

(57) ABSTRACT

Electrical connections are created between the actuator frame of a piezoelectric MEMS scanning mirror system and the substrate separate from the structural adhesive creating the mechanical bond between the actuator frame and the substrate. A structural bond (with no conducive properties) is formed between the actuator frame and the substrate. After the bond is fully formed, separate electric connections can be created by one or both of: 1) coating the actuator frame with a coating that enables a surface of the actuator frame to be wire bondable and creating a wire bond between the actuator frame and the substrate; or 2) depositing a trace of conductive material on the outside edge of the mechanical bond between the actuator frame and the substrate and a final protection layer may be applied over the conductive trace to protect the trace from mechanical or environmental damage.

20 Claims, 9 Drawing Sheets

(51) Int. Cl.
*H02N 2/00* (2006.01)
*H02N 2/02* (2006.01)
(52) U.S. Cl.
CPC .......... *H02N 2/0085* (2013.01); *H02N 2/028* (2013.01); *H02N 2/22* (2013.01)
(58) Field of Classification Search
USPC ......... 359/198.1–199.4, 200.6–200.8, 202.1, 359/221.2, 223.1–225.1, 226.2, 904
See application file for complete search history.

WIRE BONDED COMMON ELECTRICAL CONNECTION IN A PIEZOELECTRIC MICRO-ELECTRO-MECHANICAL SYSTEM SCANNING MIRROR ASSEMBLY

CROSS-REFERENCE TO RELATED APPLICATIONS

This application is a divisional of U.S. patent application Ser. No. 16/382,876 filed on Jan. 11, 2021, now U.S. Pat. No. 11,555,999, the entire contents of which are incorporated by reference herein.

BACKGROUND

In traditional piezoelectric micro-electro-mechanical system (MEMS) scanning mirror systems, a metal frame acts as the common electrical connection for all of the piezoelectric elements. Accordingly, an electrical connection must also be made between the metal frame and the substrate, which serves as the electrical and mechanical interconnect for the device. To accommodate this electrical connection, a conductive adhesive is used to mechanically and electrically connect the frame to the substrate. However, combining both electrical and mechanical function into one adhesive bond affects the mechanical performance of the bond. Moreover, because the consistency of conductive and structural adhesives may vary at each attachment point, variations in the mechanical strength of the bonds cause efficiency issues in the system. Alternatively, using conductive adhesives alone suffers from marginal mechanical strength of the bond causing the system components to fail.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Aspects of the present invention relate to scanning mirror systems. More particularly, aspects of the present invention relate to creating electrical connections between the actuator frame of a piezoelectric MEMS scanning mirror system and the substrate separate from the structural adhesive creating the mechanical bond between the actuator frame and the substrate. To do so, a structural bond (with no conducive properties) is used to attach the actuator frame to the substrate. After the bond is fully formed, separate electric connections can be created in one of two ways. In one aspect, the actuator frame may be coated with a coating that enables a surface of the actuator frame to be wire bondable. A wire bond can then be created between the actuator frame and substrate. In another aspect, a trace of conductive material is deposited on the outside edge of the mechanical bond between the actuator frame and the substrate and a final protection layer may be applied over the conductive trace to protect the trace from mechanical or environmental damage. The result is a system with maximum mechanical performance and increased efficiency.

These and other aspects of the invention will become apparent to one of ordinary skill in the art upon a reading of the following description, drawings, and the claims.

BRIEF DESCRIPTION OF THE DRAWINGS

The present invention is described in detail herein with reference to the attached drawing figures, wherein.

DETAILED DESCRIPTION

The subject matter of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. As used herein, the singular forms "a," "an," and "the" are intended to include the plural forms as well, unless the context clearly indicates otherwise.

As noted in the Background, in traditional piezoelectric MEMS scanning mirror systems, a metal actuator frame (not compatible with wire bonding) acts as the common electrical connection for all of the piezoelectric elements (i.e., the actuators). Since the substrate serves as the electrical and mechanical interconnect for the device, an electrical connection must also be made between the metal actuator frame and the substrate. In previous devices, a conductive adhesive was typically used to mechanically and electrically connect the actuator frame to the substrate. However, conductive adhesives are not as mechanically strong as adhesives that are dedicated for structural purposes. The decrease in mechanical strength introduced reliability issues into the device.

In an attempt to prevent these reliability issues, the conductive and structural adhesives were mixed (e.g., ten percent conductive and ninety percent structural). However, the adhesives did not mix uniformly throughout the bond and variations in the mechanical strength and conductive properties resulted. For example, the conductive adhesive may be covered by the structural adhesive and conductive issues occur. Similarly, the structural adhesive may be covered or diluted at a place where the structural bond occurs, and structural issues may occur.

Ultimately, each iteration of the device suffered efficiency issues. As the efficiency decreases, the device ceases to function properly. In particular, additional modes of motion are created because the resonant frequency shifts due to the structural weakening of the bond. The wire bonds attached to the mirror provide a feedback element so the angle the central mirror is moving can be determined. As the bond fails, the required voltage must increase to move the anchor portions of the mirror at a greater angle to achieve the desired effect in the mirror. Eventually, the system is no longer able to supply enough voltage to move the mirror to the required angle. Even if the voltage supply is able to be increased, the actuator will eventually fail as well.

Aspects of the present invention relate to creating electrical connections between the actuator frame of a piezoelectric MEMS scanning mirror system and the substrate separate from the structural adhesive creating the mechanical bond between the actuator frame and the substrate. Initially, a structural bond (with no conducive properties) is used to attach the actuator frame to the substrate. After the bond is fully formed, separate electric connections can be created in one of two ways. In one aspect, the actuator frame may be coated with a coating that enables a surface of the actuator frame to be wire bondable. A wire bond can then be created between the actuator frame and substrate. In another aspect, a trace of conductive material is deposited on the outside edge of the mechanical bond between the actuator frame and the substrate and a final protection layer may be applied over the conductive trace to protect the trace from mechanical or environmental damage. Both the wire bond and the trace of conductive material can be utilized in one device for redundancy. Similarly, more than one wire bond or more than one trace of conductive material can be utilized in one device for redundancy. The result is a system with maximum mechanical performance and increased efficiency over previous devices.

Accordingly, one aspect of the present disclosure is directed to a wire bonded common electrical connection in a scanning mirror system. The system comprises an actuator frame consisting of a frame material coated with a coating that enables a surface of the actuator frame to be wire bondable. The system also comprises at least one actuator having a top electrode on a top surface of the actuator and a bottom electrode on a bottom surface of the actuator. The at least one actuator may be attached to a top surface of the actuator frame with a partially conductive adhesive. The system further comprises a mirror extending across a gap in a central mounting member of the actuator frame. Anchor portions of the mirror are attached to the top surface of the actuator frame with a structural adhesive. The system also comprises a substrate connected to a bottom surface of the actuator frame with a structural adhesive. An electrical pad on the substrate enables an electrical connection between the top electrode on the top surface of the at least one actuator and the substrate, the mirror and the substrate, and the top surface of the actuator frame to the substrate.

In another aspect, the present disclosure is directed to a wire bonded common electrical connection in a scanning mirror system. The system comprises an actuator frame coated with a coating that enables a surface of the actuator frame to be wire bondable. The system also comprises at least one actuator attached to a top surface of the actuator frame with a partially conductive adhesive. The system further comprises a mirror extending across a gap in central mounting member of the actuator frame. Anchor portions of the mirror are attached to the top surface of the actuator frame with a structural adhesive. The system also comprises a substrate connected to a bottom surface of the actuator frame with a structural adhesive having no conductive properties, an electrical pad on the substrate enabling an electrical connection between a top surface of the actuator frame and the substrate.

In yet another aspect, the present disclosure is directed to a conductive bridge in a piezoelectric MEMS scanning mirror system. The system comprises an actuator frame consisting of a frame material. The system also comprises at least one actuator having a top electrode on a top surface of the actuator and a bottom electrode on a bottom surface of the actuator. The at least one actuator may be attached to a top surface of the actuator frame with a partially conductive adhesive. The system further comprises a mirror extending across a gap in a central mounting member of the actuator frame. Anchor portions of the mirror are attached to the top surface of the actuator frame with a structural adhesive. The system also comprises a substrate connected to a bottom surface of the actuator frame with a structural adhesive having no conductive properties. The system further comprises a trace of conductive adhesive enabling an electrical connection between the top surface of the actuator frame and the substrate.

Figure 1:
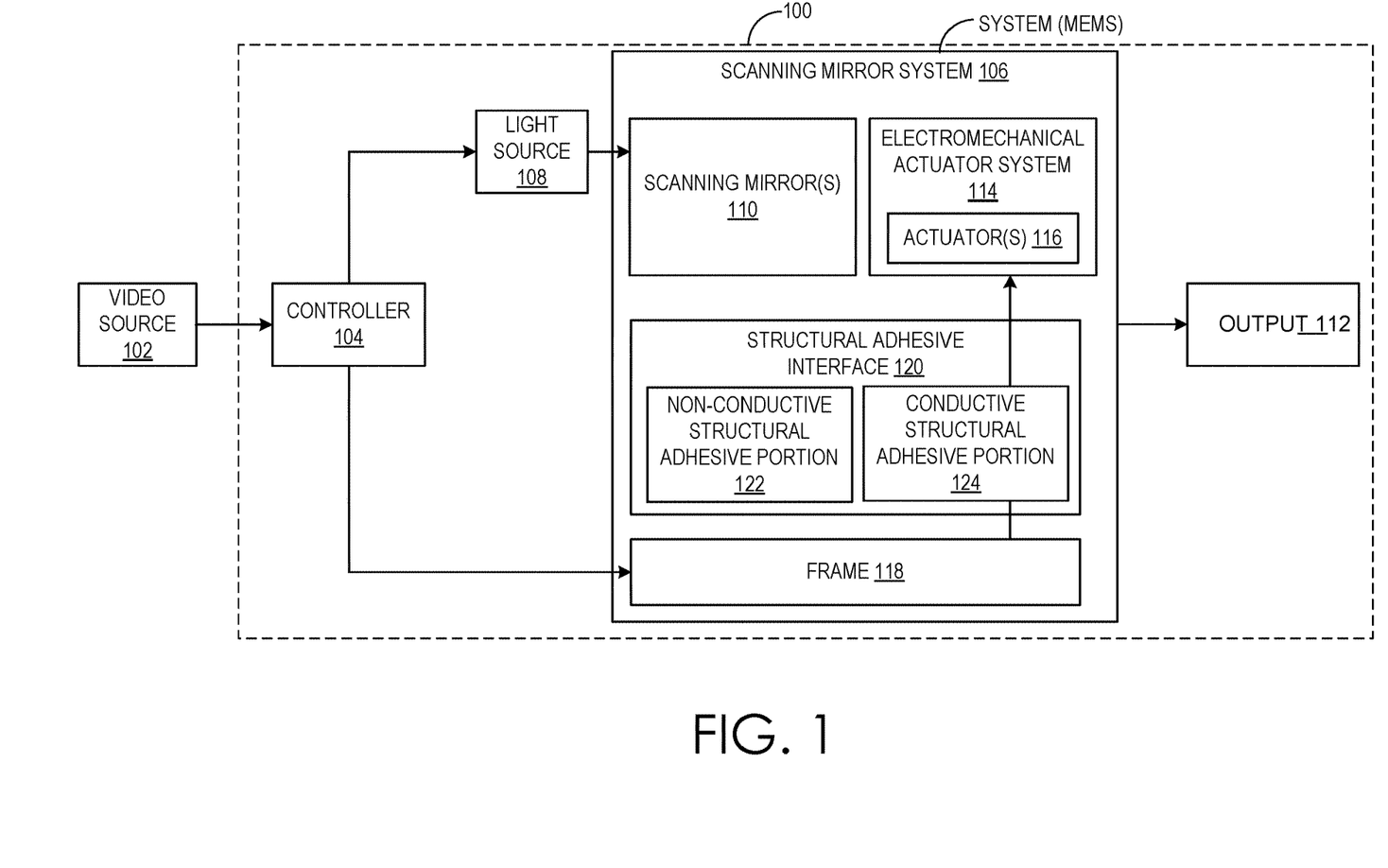
FIG. 1 shows a schematic view of an example display device that includes a MEMS bonded by structural adhesive interfaces, in accordance with aspects of the present disclosure.

FIG. 1 schematically shows an example display device 100 in communication with a video source 102. Display device 100 includes a controller 104 operatively coupled to a scanning mirror system 106 and to a light source 108. Controller 104 is configured to control light source 108 to emit light based on video image data received from video source 102. Light source 108 may include any suitable light-emitting element(s), such as one or more lasers, and may output light in any suitable wavelength ranges, such as red, green, and blue. In other examples, light source 108 may output substantially monochromatic light, or other wavelength bands than red/green/blue.

Scanning mirror system 106 comprises one or more scanning mirrors 110 controllable to vary an angle at which light from the light source is reflected to thereby scan an image. As mentioned above, the scanning mirror system 106 may include a single mirror driven in both horizontal and vertical directions, or two mirrors separately driven in horizontal and vertical directions. Light reflected by scanning mirror system 106 is directed toward an output 112 for display of a scanned image. Output 112 may take any suitable form, such as projection optics, waveguide optics, etc. As examples, display device 100 may be configured as a virtual reality head-mounted display (HMD) device with output 110 configured as an opaque surface, or as an augmented reality HMD device with the output configured as a see-through structure that allows virtual imagery to be combined with a view of the surrounding real-world environment. Display device 100 also may assume other suitable forms, such as that of a head-up display, mobile device screen, monitor, or television, as examples.

Scanning mirror system 106 further includes an electromechanical actuator system 114 comprising actuator(s) 116 to effect movement of the scanning mirror(s) 110. Various type of actuators may be used to control a MEMS mirror system.

As illustrated in FIG. 1, one or more of the scanning mirror(s) 110 and the electromechanical actuator system 114 are bonded to an actuator frame 118 by a structural adhesive interface 120. In one example, the structural adhesive interface 120 includes both a non-conductive structural adhesive portion 122 and a conductive structural adhesive portion 124 arranged such that the non-conductive structural adhesive portion 122 at least partially surrounds and encompasses the conductive structural adhesive portion 124. The controller 104 may be configured to drive the actuator(s) 116 of the electromechanical actuator system 114 via electricity conducted through the actuator frame 118 and the conductive structural adhesive portion 124 to the actuator(s) 116.

Figure 2:
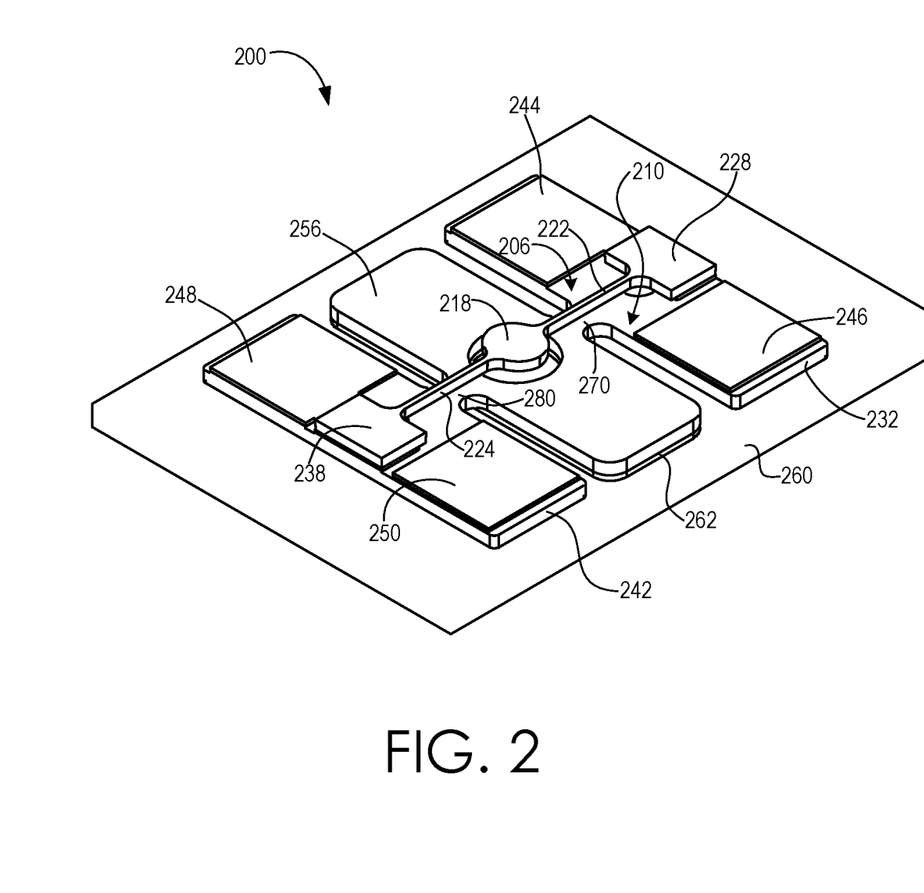
FIG. 2 shows an example scanning mirror system for the example display device of FIG. 1.
Figure 3:
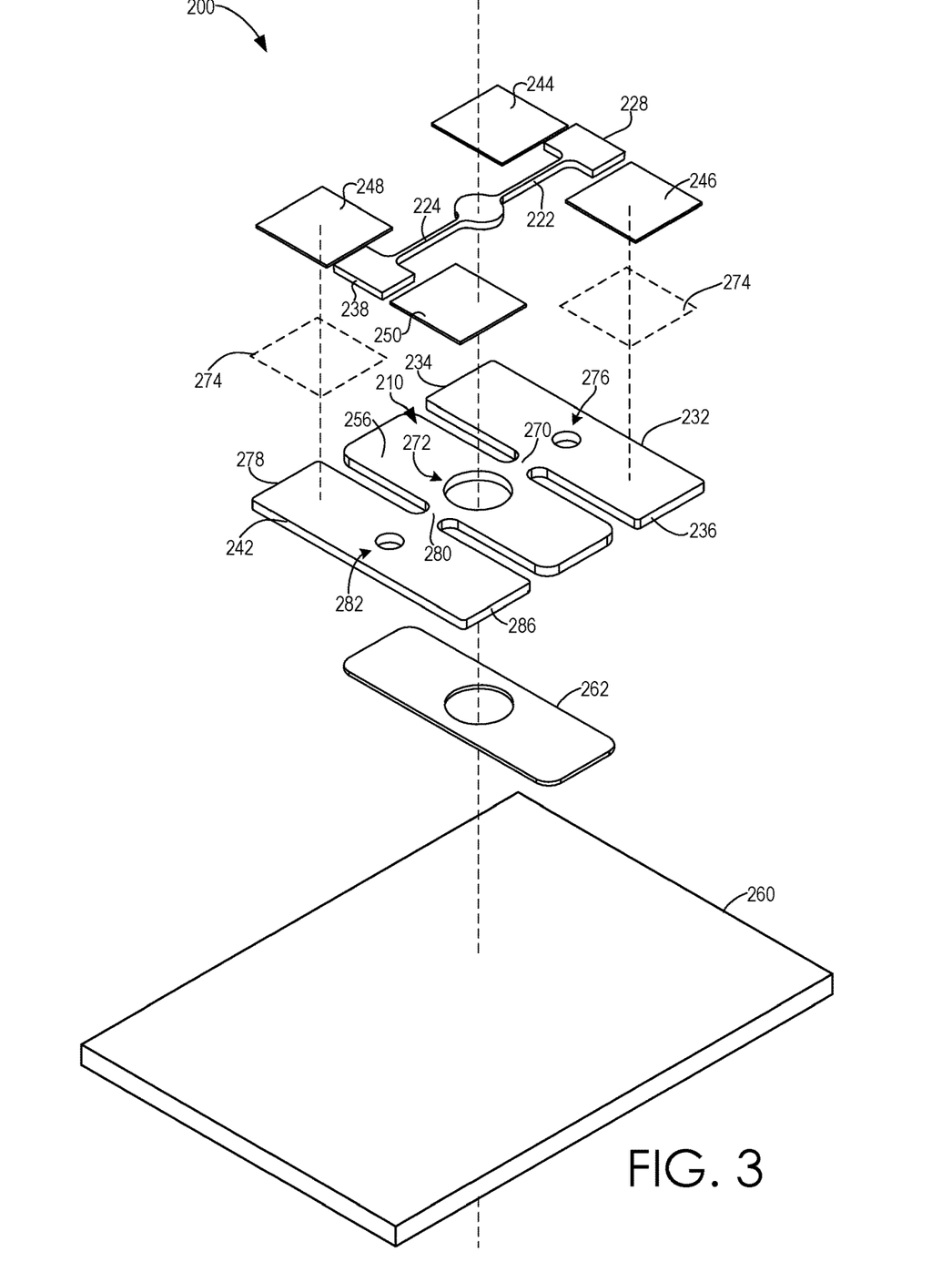
FIG. 3 shows an exploded view of the scanning mirror system of FIG. 2.
Figure 4:
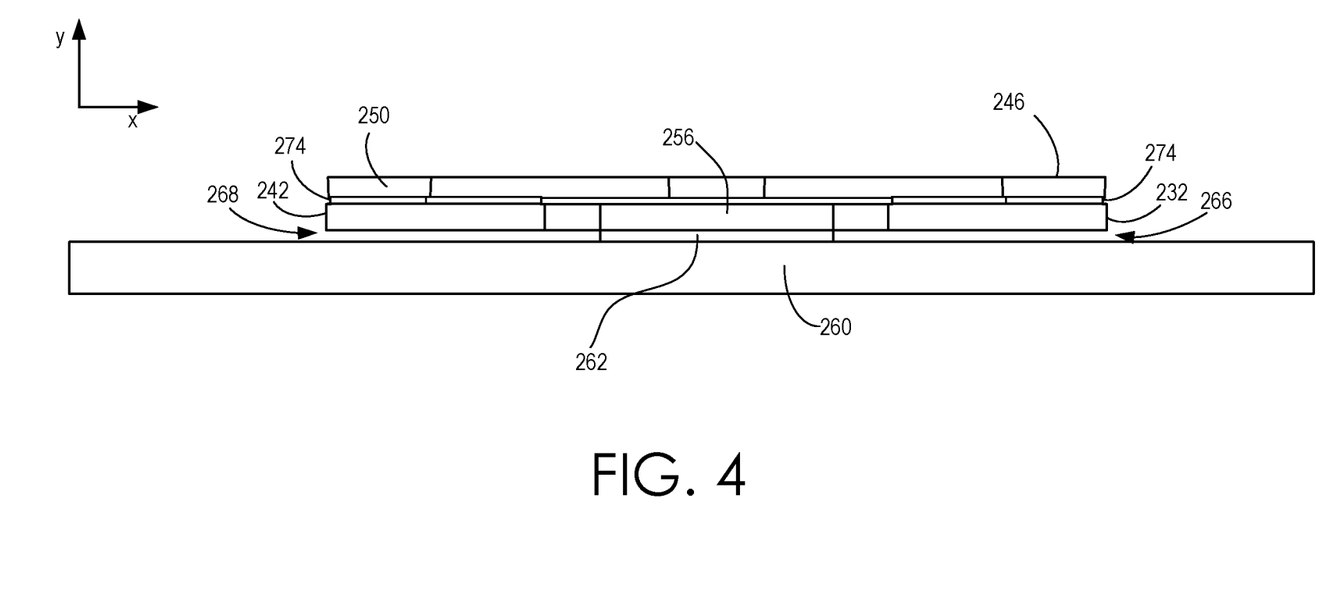
FIG. 4 shows a side view of the scanning mirror system of FIG. 2.

FIGS. 2-4 show a specific example of a scanning mirror system 200 that includes a scanning mirror assembly 206 comprising an example of an actuator frame 210. Scanning mirror assembly 206 comprises a MEMS mirror 218 attached to the actuator frame 210 via a first flexure 222 and a second flexure 224. First and second flexures 222 and 224 may provide respective pivots via which mirror 218 can rotate and thereby change its angular orientation to vary the angle at which light from a light source is reflected. Mirror 218 may scan in a horizontal or vertical direction, depending upon an orientation in which scanning mirror system 200 is incorporated into a display device.

The first flexure 222 of scanning mirror assembly 206 is connected to a first anchor portion 228. This first anchor portion is affixed to a first moveable member 232 of the actuator frame 210 by a structural adhesive interface. In a similar manner, the second flexure 224 of scanning mirror assembly 206 is connected to a second anchor portion 238 that is affixed to a second moveable member 242 of the actuator frame 210 by a structural adhesive interface. As described in more detail below, actuators affixed to the moveable members are controlled to cause corresponding movement in the mirror 218.

In this example, the scanning mirror system 200 includes an electromechanical actuator system comprising a first actuator pair affixed to the first moveable member 232 adjacent to the first flexure 222, and a second actuator pair affixed to the second moveable member 242 adjacent to the second flexure 224. The first actuator pair comprises first actuator 244 and second actuator 246, and the second actuator pair comprises third actuator 248 and fourth actuator 250.

The actuators may be controlled to cause a desired oscillation in the mirror 218. For example, the actuators may comprise a lead zirconate titanate (PZT) material or piezoelectric ceramic material that changes dimension based upon an applied voltage. For example, upon receiving an electrical signal having a first polarity (e.g., positive), actuators 244 and 248 may apply a contractive force to portions of moveable members 232 and 242, respectively, underlying these actuators. On the other hand, upon receiving the electric signal having the first polarity, actuators 246 and 250 may apply a dilative force to portions of moveable members 232 and 242, respectively, underlying these actuators. An electrical signal having a second, different polarity (e.g., negative) may cause actuators 244 and 248 to apply a dilative force to the respective underlaying portions of the moveable members, and may cause actuators 246 and 250 to apply a contractive force to the respective underlaying portions of the moveable members 232 and 242. The magnitude of force applied by actuators 244, 246, 248 and 250 may be controlled by controlling the magnitude of an electrical signal applied to the actuators. As discussed above, the electrical signal applied to the actuators may be conducted through the conductive structural adhesive portion 124 of the structural adhesive interface 120 bonding each actuator to respective underlaying portions of the moveable members 232 and 242. In this manner, the electrical signal may be applied to the conductive material of the actuator frame 210 and conducted to each of the actuators 244, 246, 248 and 250 via the conductive structural adhesive portion 124.

In other examples the electromechanical actuator system of scanning mirror system 200 may utilize any suitable type of actuators. For example, each actuator may comprise a magnetic actuator, wherein a magnetic force between magnetic elements can be varied via electrical signal. In other examples, each actuator may comprise an electrostatic actuator, where an electric field between electrodes can be varied to adjust contractive or dilative forces. As a further example, each electromechanical actuator may utilize one or more bimetallic strips, where differing coefficients of thermal expansion of different materials can be leveraged to vary the applied forces. It will also be appreciated that actuator(s) of an electromechanical actuator system may be arranged at other suitable locations in a scanning mirror system.

In this example, a central mounting member 256 of the actuator frame 210 is affixed to an underlying substrate 260 via a spacer 262. In some examples the actuator frame 210 may comprise a metallic material, such as steel, and the substrate 260 may comprise a PCB, ceramic material, or any other suitable material. The spacer 262 may comprise any suitable metallic material, such as steel. The central mounting member 256 may be bonded to the spacer 262, and the spacer bonded to the substrate 260 via the structural adhesive interface 120, such that an electric signal may be conducted from the substrate 260 to the actuators 244, 246, 248 and 250.

In the example of FIGS. 2-4, spacer 262 elevates the actuator frame 210 above the substrate 260 to thereby enable movement of the moveable members 232 and 242. More particularly and as shown in FIG. 4, spacer 262 creates gaps 266 and 268 between moveable members 232 and 242, respectively, and the underlying substrate 260. In this manner, the first moveable member 232 and the second moveable member 242 float above the substrate 260, and thereby may cause movement of the mirror 218 via flexures 222 and 224. In one example, each of the gaps 266 and 268 may be approximately 0.4 mm to 0.6 mm, or more specifically 0.5 mm, to enable y-axis movement of the first moveable member 232 and second moveable member 242 relative to the substrate 260. In other examples, any other suitable gap distances may be utilized to accommodate different scanning mirror system configurations and desired mirror movements. In the present example, the spacer 262 has substantially the same shape as the mounting member 256 of the actuator frame 210. In other examples, the spacer 262 may have a shape different from the mounting member 256. As shown in FIG. 3, the actuators 244, 246, 248 and 250 are bonded to respective underlaying portions of the moveable members 232 and 242 of the actuator frame 210 by partially conductive adhesive 274.

As illustrated in FIG. 3, the actuator frame 210 comprises a first hinge 270 that connects a central portion 272 of the mounting member 256 with a central portion 276 of the first moveable member 232. In this example, the first hinge 270 is located substantially equidistant from the opposing ends 234 and 236 of the first moveable member 232. Similarly, the central portion 276 of the first moveable member 232 is located substantially midway between the opposing ends 234 and 236 of the first moveable member. In this example, both central portion 272 and central portion 276 comprise an aperture. It will be appreciated that in other examples, the mounting member 256 and first moveable member 232 may have different configurations that include one or more apertures of different shapes, sizes, and/or locations, or configurations that include no apertures.

In a similar manner, actuator frame 210 comprises a second hinge 280 that connects central portion 272 of the mounting member 256 with a central portion 282 of the second moveable member 242. As with the first hinge 270, the second hinge 280 is located substantially equidistant from the opposing ends 278 and 286 of the second moveable member 242. The central portion 282 of the second moveable member 242 is also located substantially midway between the opposing ends 278 and 286 of the second moveable member. In this example, both central portion 272 and central portion 282 comprise an aperture. As with the first moveable member 232, in other examples the mounting member 256 and second moveable member 242 may have different configurations that include apertures of different shapes, sizes, and/or locations, or configurations that include no apertures. In some examples, actuator frame 210 may be formed from micromachined silicon dies.

As illustrated in FIG. 3, each of the actuators 244, 246, 248, and 250 may be bonded to respective underlaying portions of the moveable members 232 and 242 of the actuator frame 210 by partially conductive adhesive 274. In one example, the anchor portion 228 and 238 connected to the mirror 218 may also be bonded to underlaying portions of the moveable members 232 and 242 by structural adhesive.

Figure 5:
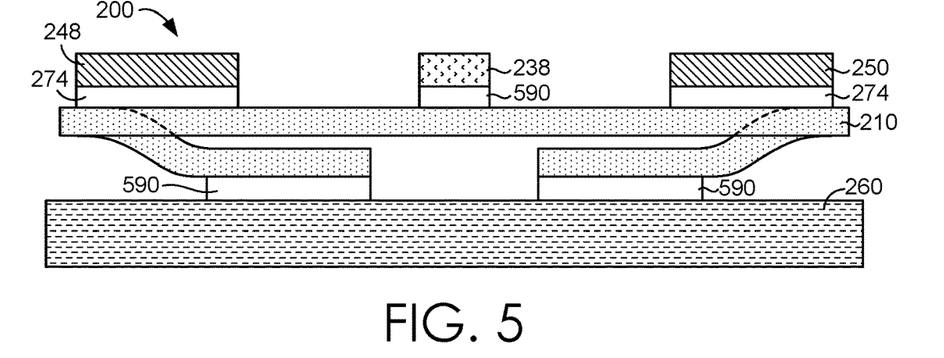
FIG. 5 is a side elevation of a scanning mirror system, in accordance with aspects of the present disclosure.

Referring now to FIG. 5, a side elevation of a scanning mirror system 200 is illustrated, in accordance with aspects hereof. Some components referenced in FIGS. 2-4 are not depicted in FIGS. 5-8 and 10 to more clearly emphasize particular aspects of the present disclosure. Although each of FIGS. 2-8 and 10 depict certain components, it will be appreciated that in various aspects of the present disclosure, the scanning mirror system may have different configurations that include one or more components described herein in different shapes, sizes, and/or locations (e.g., a different shaped actuator frame), or different configurations that include or exclude some of these components. As illustrated, the bottom surface of an actuator frame 210 is attached to a substrate 260 with a structural adhesive. Importantly, the structural adhesive has no conductive properties which enables maximum mechanical performance of the bond between the actuator frame 210 and the substrate 260 to be obtained. In aspects, the actuator frame 210 is made of a frame material that has a thermal expansion matched to a mirror. For example, the frame material may be alloy 42. The actuator frame 210 is also coated with a coating (e.g., electroless nickel immersion gold coating or electroless nickel electroless palladium immersion gold coating). The coating enables a surface of the actuator frame 210 to be compatible with wire bonding that would not otherwise be wire bondable.

The scanning mirror system 200 also includes at least one actuator 248, 250. The actuator(s) 248, 250 has a top electrode on the top surface and a bottom electrode on the bottom surface and is attached to a top surface of the actuator frame 210 with a partially conductive adhesive 274. In this way, the bottom electrode of the actuator 248, 250 is shorted to the top surface of the actuator frame 210.

In the scanning mirror system 200, the electrical connections and routing occur in the substrate 260. The top electrode of the actuator is wire bonded (not shown) to an electrical pad (not shown) on the substrate 260. In aspects, four wire bonds enable the electrical connection between the top surface of each of four actuators and the substrate 260.

A mirror extends across a gap (not shown in FIG. 1) in a central mounting member of the actuator frame 210. Anchor portions 228, 238 of the mirror are attached to the top surface of the actuator frame 210 with a structural adhesive 590. The mirror is wire bonded (not shown) to an electrical pad (not shown) on the substrate 260. In some aspects, four wire bonds enable the electrical connection between the mirror and the substrate 260.

Figure 6:
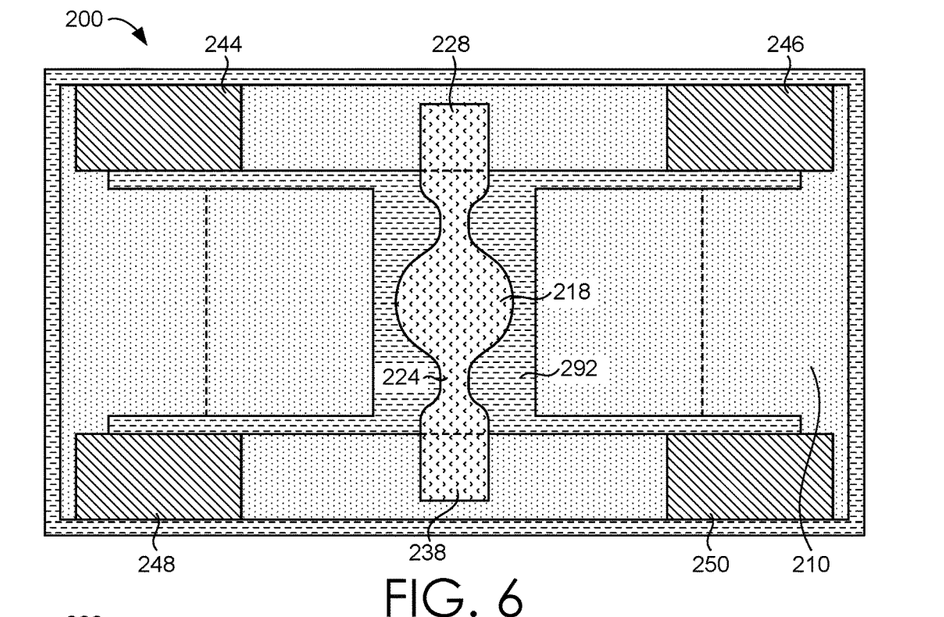
FIG. 6 is a top plan view of a scanning mirror system, in accordance with aspects of the present disclosure.

FIG. 6 is a side elevation of a scanning mirror system 200, in accordance with aspects hereof. As illustrated, the scanning mirror system 200 includes four actuators 244, 246, 248, 250. As described above, each of the actuators 244, 246, 248, 250 has a top electrode on the top surface and a bottom electrode on the bottom surface and is attached to a top surface of the actuator frame 210 with a partially conductive adhesive (not shown in FIG. 2). The top electrode of each of the actuators 244, 246, 248, 250 is wire bonded (not shown) to an electrical pad (not shown) on the substrate 260. The wire bonds enable the electrical connection between the top surface of each of the actuators 244, 246, 248, 250 and the substrate 260.

As described above, a mirror 218 extends across an aperture 292 in a middle of the actuator frame 210. Anchor portions 228, 238 of the mirror 218 are attached to the top surface of the actuator frame 210 with a structural adhesive (not shown in FIG. 2) and are connected to the mirror 218 by first flexure and second flexure 224. The mirror is also wire bonded (not shown) to an electrical pad (not shown) on the substrate 260. In some aspects, four wire bonds enable the electrical connection between the mirror and the substrate 260.

Figure 7:
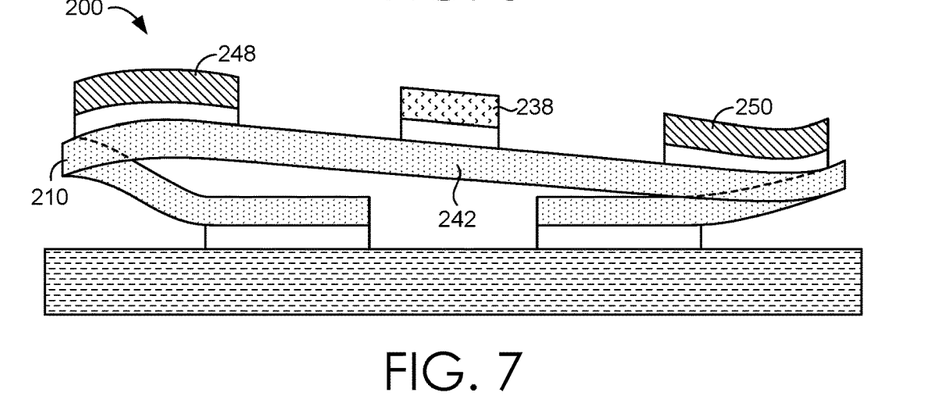
FIG. 7 is a side elevation illustrating movement of a scanning mirror system, in accordance with aspects of the present disclosure.

FIG. 7 depicts a side elevation illustrating movement of a scanning mirror system 200, in accordance with aspects hereof. The movement of the scanning mirror system 200 in FIG. 7 is exaggerated for illustrative purposes. For clarity, the piezoelectric effect is the ability of certain materials to generate an electric charge in response to applied mechanical stress. Conversely, when an electric field is applied to these materials, the materials become stressed and can shrink or expand.

In the context of the scanning mirror system 200 described herein, when an electric field is applied across an actuator 248, 250 in the Z direction, the actuators 248, 250 attempt to shrink or expand in the X and Y direction. Since the actuators 248, 250 are constrained by the actuator frame 210 (i.e., the actuator frame attempts to keep the actuator 248, 250 the same size), the actuators 248, 250 curve. In the case where an actuator on one side of the actuator frame 210 attempts to shrink (e.g., the actuator 248) and an actuator on the other side of the actuator frame 210 attempts to expand (e.g., the actuator 250), the actuators 248, 250 curve in opposite directions, causing second moveable member 242 of the actuator frame 210 to tilt slightly. Since the anchor portion 238 of the mirror 218 is attached to the second moveable member 242, the tilting of the anchor portion 238 causes movement of the mirror 218 via the flexure(s) (not shown in FIG. 7) at a much higher degree.

Figure 8:
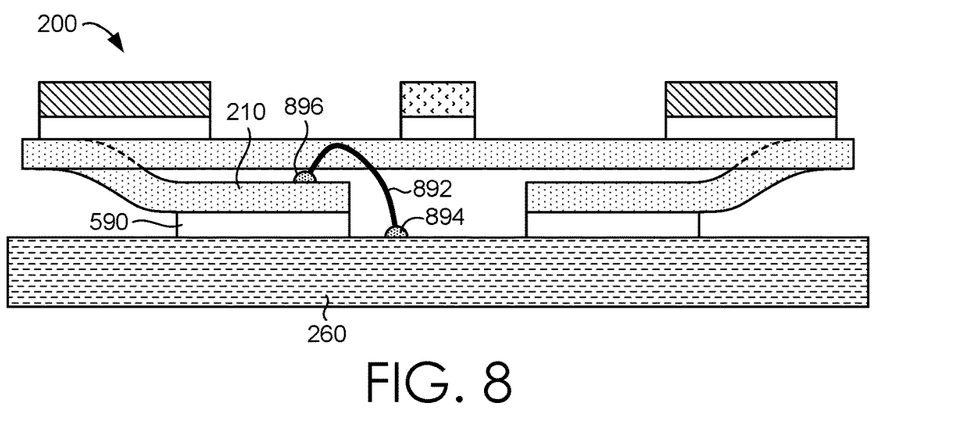
FIG. 8 is a side elevation of an exemplary wire bonded common electrical connection in a scanning mirror system, in accordance with aspects of the present disclosure.

Referring now to FIG. 8, a side elevation of an exemplary wire bonded common electrical connection in a scanning mirror system 200 is illustrated, in accordance with aspects hereof. As illustrated, the scanning mirror system 200 includes a wire bond 892 between the common trace 894 on the substrate 260 to the surface of the actuator frame 896.

As illustrated, the bottom surface of an actuator frame 210 is attached to a substrate 260 with a purely structural adhesive 590. As emphasized above, the structural adhesive 590 has no conductive properties which enables maximum mechanical performance of the bond between the actuator frame 210 and the substrate 260 to be obtained. The actuator frame 210 is coated with a coating (e.g., electroless nickel immersion gold coating or electroless nickel electroless palladium immersion gold coating). The coating enables a surface of the actuator frame 896 to be compatible with wire bonding that would not otherwise be wire bondable. The wire bond 892 applied at the surface of the actuator frame 896 completes an electrical connection between the actuator frame 210 and the substrate 260 (by way of an electrical pad 894 on the substrate 260). In some aspects the wire bond 892 is a gold wire and the coating on the surface of the actuator frame 896 and the trace on the electric pad 894 on the substrate 260 comprise a gold surface finish (e.g., electroless nickel immersion gold or electroless nickel electroless palladium immersion gold). In some aspects, multiple wire bonds can be applied for in different locations for redundancy. In some aspects, the wire bonded common electrical connection can be combined with the conductive bridge described with respect to FIG. 10 for redundancy.

Figure 9:
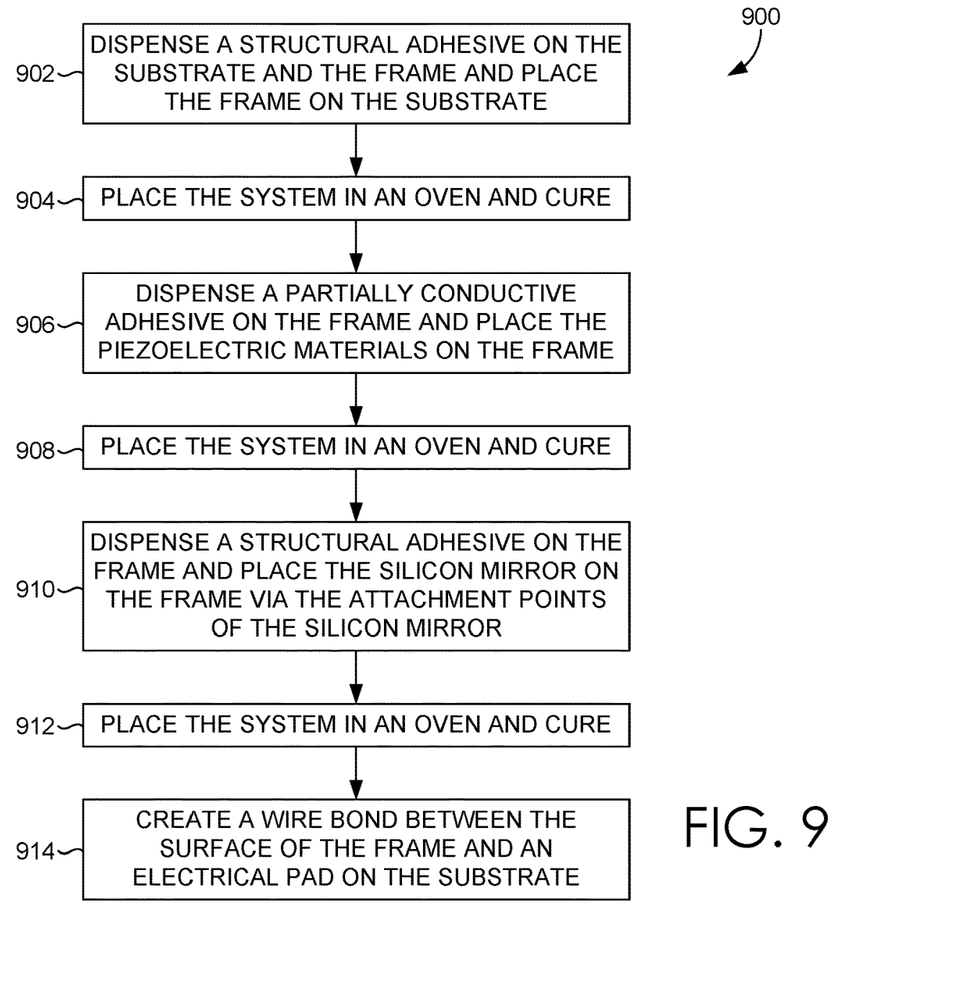
FIG. 9 depicts a flow diagram of an exemplary method for wire bonding a common electrical connection in a scanning mirror system, in accordance with aspects of the present disclosure.

FIG. 9 depicts a flow chart illustrating a method 900 of providing a wire bonded common electrical connection in a scanning mirror system. Although the method is presented in a particular order, it should be appreciated that the method can be performed in a variety of orders. As illustrated, at step 902, a structural adhesive is dispensed on the substrate and the actuator frame (that has been coated with a coating compatible with wire bonds) is placed on the substrate. At step 904, the system is placed in an oven and cured. A partially conductive adhesive is dispensed on the actuator frame, at step 906, and the actuators are placed on the actuator frame. At step 908, the system is placed in an oven and cured. A structural adhesive is dispensed on the actuator frame, at step 910, and the mirror is placed on the actuator frame via the anchor portions of the mirror. At step 912, the system is placed in an oven and cured. A wire bond is created, at step 914, between the surface of the actuator frame and an electrical pad on the substrate.

Figure 10:
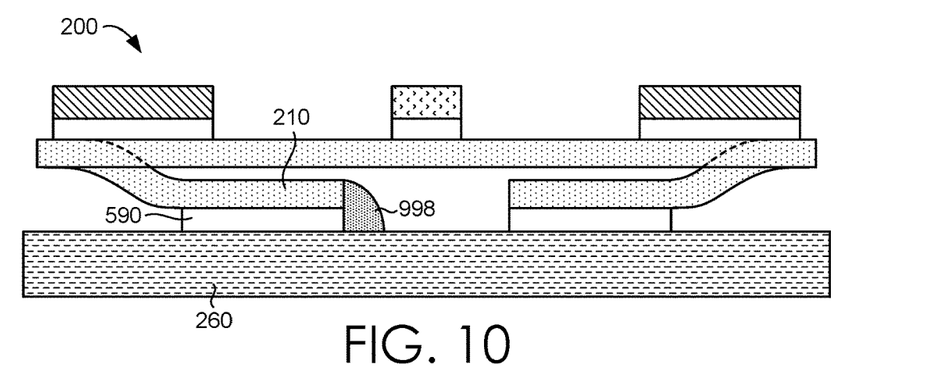
FIG. 10 is a side elevation of an exemplary conductive bridge in a scanning mirror system, in accordance with aspects of the present disclosure.

Turning now to FIG. 10, a side elevation of an exemplary conductive bridge in a scanning mirror system 200 is illustrated, in accordance with aspects hereof. As illustrated, the bottom surface of an actuator frame 210 is attached to a substrate 260 with a purely structural adhesive 590. As mentioned above, the structural adhesive 590 has no conductive properties which enables maximum mechanical performance of the bond between the actuator frame 210 and the substrate 260 to be obtained. To create the electrical connection between the actuator frame and the substrate, a conductive adhesive 998 is dispensed at the edge of the actuator frame, down the side of the structural bond, and to an electrical pad on the substrate 260. In some aspects, a protection layer is applied over the conductive adhesive 998 to protect the conductive bridge from mechanical or environmental damage. The conductive bridge can be applied in multiple locations between the actuator frame and the substrate for redundancy. In some aspects, the conductive bridge can be combined with the wire bonded electrical connection described with respect to FIG. 8 for redundancy.

Figure 11:
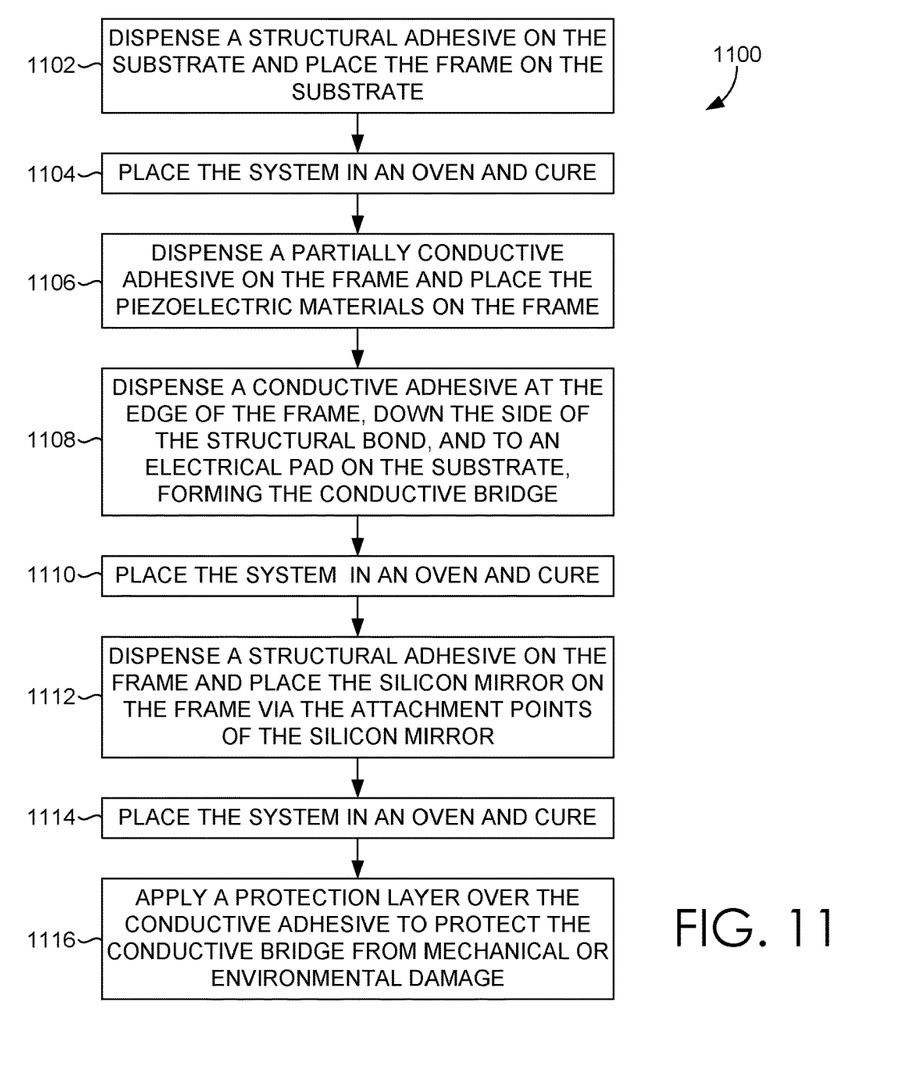
FIG. 11 shows an example method for creating a conductive bridge in a scanning mirror system, in accordance with aspects of the present disclosure.

FIG. 11 depicts a flow chart illustrating a method 1100 of providing conductive bridge in a piezoelectric MEMS scanning mirror system. Although the method is presented in a particular order, it should be appreciated that the method can be performed in a variety of orders. As illustrated, at step 1102, a structural adhesive is dispensed on the substrate and the actuator frame is placed on the substrate. The system is placed in an oven and cured, at step 1104. A partially conductive adhesive is dispensed on the actuator frame, at step 1106, and the actuators are placed on the actuator frame. At step 1108, a conductive adhesive is dispensed at the edge of the actuator frame, down the side of the structural bond, and to an electrical pad on the substrate, forming the conductive bridge. The system is placed in an oven and cured, at step 1110. A structural adhesive is dispensed on the actuator frame, at step 1112, and the mirror is placed on the actuator frame via the anchor portions of the mirror. At step 1114, the system is placed in an oven and cured. A protection layer is applied over the conductive adhesive, at step 1116, to protect the conductive bridge from mechanical or environmental damage.

Figure 12:
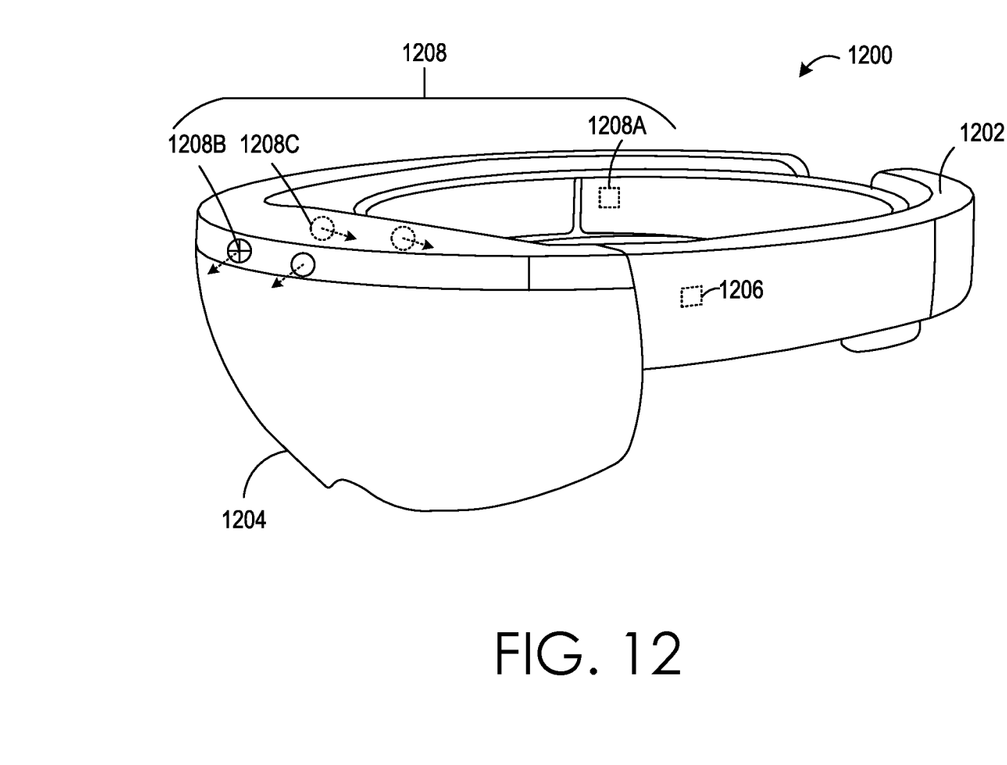
FIG. 12 shows a side perspective view of a computing device in the form of a head mounted display (HMD) device that includes the example display device of FIG. 1.

FIG. 12 shows an example head mounted display (HMD) device 1200 that may include the example display device 100 illustrated in FIG. 1 and the example scanning mirror system 200 illustrated in FIGS. 3-5. The HMD device 1200 may be worn by a user according to an example of the present disclosure. In other examples, an HMD device may take other suitable forms in which an at least partially see-through display is supported in front of a viewer's eye or eyes in an augmented reality HMD device configuration.

In the example of FIG. 12, the HMD device 1200 includes a frame 1202 that wraps around the head of the user to position a display device 1204 close to the user's eyes. The display device 1204, may, for example, take the form of the example display device 100 illustrated in FIG. 1 and described above. The frame supports additional components of the HMD device 1200, such as, for example, a processor 1206 and input devices 1208. The processor 806 includes logic and associated computer memory configured to provide image signals to the display device 1204, to receive sensory signals from input devices 1208, and to enact various control processes described herein. The processor 1206 may take the form of the controller 104 illustrated in FIG. 1.

The input devices 1208 may include various sensors and related systems to provide information to the processor 1206. Such sensors may include, but are not limited to, an inertial measurement unit (IMU) 1208A, one or more outward facing image sensors 1208B, and one or more inward facing image sensors 1208C. The one or more inward facing image sensors 1208B may be configured to acquire image data in the form of gaze tracking data from a wearer's eyes.

The one or more outward facing image sensors 1208B may be configured to capture and/or measure physical environment attributes of the physical environment in which the HMD device 1200 is located. In one example, outward facing image sensors 1208b may include a visible-light camera configured to collect a visible-light image of a physical space. Further, the one or more outward facing image sensors 1208B may include a depth camera configured to collect a depth image of a physical space. More particularly, in one example the depth camera is an infrared time-of-flight depth camera. In another example, the depth camera is an infrared structured light depth camera.

Data from the outward facing image sensors 1208B may be used by the processor 1206 to generate and/or update a three-dimensional (3D) model of the physical space. Data from the outward facing image sensors 1208B may be used by the processor 1206 to identify surfaces of the physical space and/or measure one or more surface parameters of the physical space. The processor 1206 may execute instructions to generate/update virtual scenes displayed on display device 1204 and identify surfaces of the physical space in any suitable manner.

In augmented reality configurations of HMD device 1200, the position and/or orientation of the HMD device 1200 relative to the physical environment may be assessed so that augmented-reality images may be accurately displayed in desired real-world locations with desired orientations. As noted above, the processor 806 may execute instructions to generate a 3D model of the physical environment including surface reconstruction information that may be used to identify surfaces in the physical space. In both augmented reality and non-augmented reality configurations of HMD device 1200, the IMU 1208A of HMD device 1200 may be configured to provide position and/or orientation data of the HMD device 1200 to the processor 1206.

In some embodiments, the methods and processes described herein may be tied to a computing system of one or more computing devices. In particular, such methods and processes may be implemented as a computer-application program or service, an application-programming interface (API), a library, and/or other computer-program product.

Figure 13:
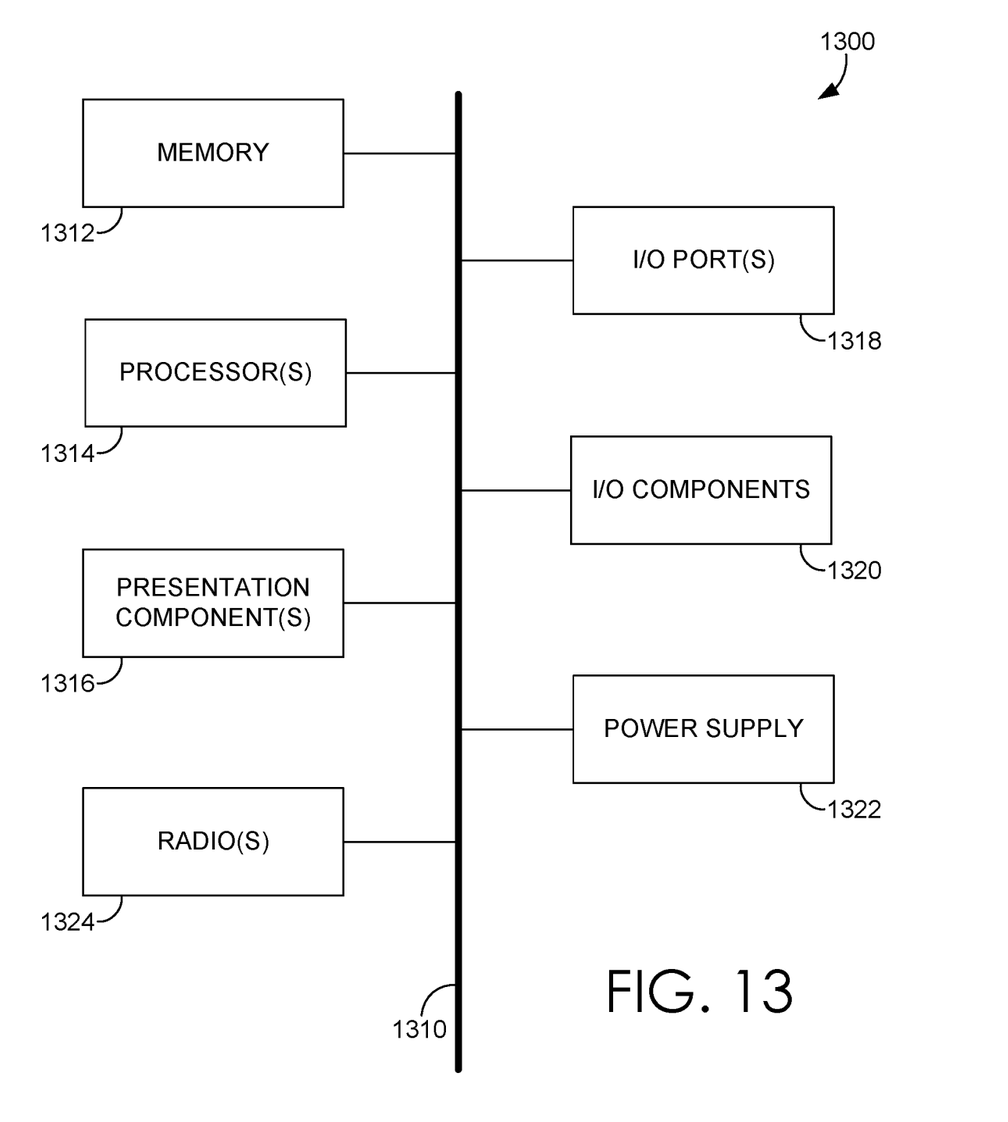
FIG. 13 is a block diagram that illustrates an exemplary computing device.

With reference to FIG. 13, computing device 1300 includes a bus 1310 that directly or indirectly couples the following devices: memory 1312, one or more processors 1314, one or more presentation components 1316, one or more input/output (I/O) ports 1318, one or more I/O components 1320, and an illustrative power supply 1322. Bus 1310 represents what may be one or more busses (such as an address bus, data bus, or combination thereof). Although the various blocks of FIG. 13 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 13 is merely illustrative of an exemplary computing device that can be used in connection with one or more aspects of the present technology. Distinction is not made between such categories as "workstation," "server," "laptop," "handheld device," etc., as all are contemplated within the scope of FIG. 13 and with reference to "computing device."

Computing device 1300 typically includes a variety of computer-readable media. Computer-readable media can be any available media that can be accessed by computing device 1300 and includes both volatile and nonvolatile media, removable and non-removable media. By way of example, and not limitation, computer-readable media may comprise computer-storage media and communication media.

Computer-storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 1300. Computer storage media does not comprise signals per se.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 1312 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors 1314 that read data from various entities such as memory 1312 or I/O components 1320. Presentation component(s) 1316 presents data indications to a user or other device. Exemplary presentation components include a display device, speaker, printing component, vibrating component, and the like.

The I/O ports 1318 allow computing device 1300 to be logically coupled to other devices, including I/O components 1320, some of which may be built in. Illustrative components include a microphone, joystick, game pad, satellite dish, scanner, printer, wireless device, etc.

The I/O components 1320 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 1300. The computing device 1300 may be equipped with depth cameras, such as stereoscopic camera systems, infrared camera systems, RGB camera systems, and combinations of these, for gesture detection and recognition. Additionally, the computing device 1300 may be equipped with accelerometers or gyroscopes that enable detection of motion. The output of the accelerometers or gyroscopes may be provided to the display of the computing device 1300 to render immersive augmented reality or virtual reality.

Some aspects of computing device 1300 may include one or more radio(s) 1324 (or similar wireless communication components). The radio 1324 transmits and receives radio or wireless communications. The computing device 1300 may be a wireless terminal adapted to receive communications and media over various wireless networks. Computing device 1300 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

What is claimed is:

1. A conductive bridge in a piezoelectric micro-electro-mechanical system (MEMS) scanning mirror system, the system comprising:
    an actuator frame consisting of a frame material;
    at least one actuator having a top electrode on a top surface of the at least one actuator and a bottom electrode on a bottom surface of the at least actuator, the at least one actuator attached to a top surface of the actuator frame with a partially conductive adhesive;
    a mirror extending across a gap in a central mounting member of the actuator frame and attached with a top structural adhesive via anchor portions of the mirror to the top surface of the actuator frame;
    a structural connection comprising a substrate structurally connected to a bottom structural adhesive and the bottom structural adhesive structurally connected to a bottom surface of the actuator frame creating a mechanical bond between the actuator frame and the substrate; and
    a trace of conductive adhesive enabling an electrical connection between the top surface of the actuator frame and the substrate.

2. The system of claim 1, wherein the trace of conductive adhesive runs from the top surface of the actuator frame, down the side of the actuator frame, over the bottom structural adhesive, and to an electrical pad on the substrate.

3. The system of claim 2, wherein the electrical pad on the substrate further enables the electrical connection between the top electrode on the top surface of each of four actuators and the substrate.

4. The system of claim 3, wherein the electrical pad on the substrate further enables the electrical connection between the mirror and the substrate.

5. The system of claim 1, further comprising upon the at least one actuator being stressed or compressed when an electric field is applied to the top electrode or the bottom electrode of the at least one actuator, the stress or compression of the at least one actuator is transferred to the anchor portions of the mirror via the top surface of the actuator frame causing the anchor portions to tilt, wherein tilting of the anchor portions of the mirror cause the mirror to tilt.

6. The system of claim 1, wherein the bottom structural adhesive connecting the substrate and the bottom surface of the actuator frame has no conductive properties.

7. The system of claim 1, wherein the frame material is alloy 42.

8. A method of providing a conductive bridge in a piezoelectric micro-electro-mechanical system (MEMS) scanning mirror system, the method comprising:
    dispense a bottom structural adhesive on a first structural connection comprising a substrate to cause the substrate to become structurally connected to the bottom structural adhesive and the bottom structural adhesive to become structurally connected to a bottom surface of a actuator frame creating a mechanical bond between the actuator frame and the substrate;
    dispense a partially conductive adhesive on the actuator frame;
    place one or more piezoelectric materials on the actuator frame; and
    dispense a conductive adhesive on the mechanical bond to enable an electrical connection between a top surface of the actuator frame and the substrate.

9. The method of claim 8, the method further comprising upon dispensing the bottom structural adhesive, placing the actuator frame and the substrate in an oven to cure.

10. The method of claim 8, the method further comprising upon dispensing the conductive adhesive, placing the actuator frame and the substrate in an oven to cure.

11. The method of claim 8, the method further comprising:
    dispensing a top structural adhesive on the actuator frame; and
    placing a silicon mirror on the actuator frame via attachment points on the silicon mirror.

12. The method of claim 11, the method further comprising placing the actuator frame, the substrate, and the silicon mirror in an oven to cure.

13. The method of claim 11, the method further comprising applying a protective layer over the conductive adhesive to protect the conductive bridge from mechanical or environmental damage.

14. A head mounted display (HMD) device comprising a piezoelectric micro-electro-mechanical system (MEMS) scanning mirror system including a conducting bridge, the system comprising:
    an actuator frame consisting of a frame material;
    at least one actuator having a top electrode on a top surface of the at least one actuator and a bottom electrode on a bottom surface of the at least actuator, the at least one actuator attached to a top surface of the actuator frame with a partially conductive adhesive;
    a mirror extending across a gap in a central mounting member of the actuator frame and attached with a top structural adhesive via anchor portions of the mirror to the top surface of the actuator frame;
    a structural connection comprising a substrate structurally connected to a bottom structural adhesive and the bottom structural adhesive structurally connected to bottom surface of the actuator frame creating a mechanical bond between the actuator frame and the substrate; and
    a trace of conductive adhesive enabling an electrical connection between the top surface of the actuator frame and the substrate.

15. The system of claim 14, wherein the trace of conductive adhesive runs from the top surface of the actuator frame, down the side of the actuator frame, over the bottom structural adhesive, and to an electrical pad on the substrate.

16. The system of claim 15, wherein the electrical pad on the substrate further enables the electrical connection between the top electrode on the top surface of each of four actuators and the substrate.

17. The system of claim 16, wherein the electrical pad on the substrate further enables the electrical connection between the mirror and the substrate.

18. The system of claim 17, wherein stress or compression of the at least one actuator is transferred to the anchor portions of the mirror via the top surface of the actuator frame causing the anchor portions to tilt.

19. The system of claim 18, wherein the tilt of the anchor portions of the mirror cause the mirror to tilt.

20. The system of claim 14, wherein the HMD device further includes a frame, wherein the frame supports additional components of the HMD device.

\* \* \* \* \*